United States Patent
Grube

[11] 3,728,933
[45] Apr. 24, 1973

[54] MEANS AND METHOD FOR CONTROLLING TENSION IN A THREADED MEMBER

[75] Inventor: William L. Grube, Mundelein, Ill.

[73] Assignee: Mac Lean-Fogg Lock Nut Co., Mundelein, Ill.

[22] Filed: Mar. 11, 1971

[21] Appl. No.: 123,395

Related U.S. Application Data

[63] Continuation of Ser. No. 791,366, Jan. 15, 1969, abandoned.

[52] U.S. Cl. .......................85/61, 151/15, 29/446
[51] Int. Cl. .......................F16b 31/02, F16b 39/02
[58] Field of Search .......................85/61, 62; 151/15, 151/19 R, 21 C, 21 A, 7; 285/2–4; 29/446, 452, 407

[56] References Cited

UNITED STATES PATENTS

| | | | |
|---|---|---|---|
| 1,457,749 | 6/1923 | Rast | 85/61 |
| 1,623,686 | 4/1927 | Kolthoff | 151/19 R |
| 2,520,259 | 8/1950 | Pummill | 151/19 R |
| 3,285,120 | 11/1966 | Kartiala | 85/62 |
| 3,512,447 | 5/1970 | Vaughn | 85/61 |
| 3,602,976 | 9/1971 | Grube | 85/61 X |

FOREIGN PATENTS OR APPLICATIONS 854,792   11/1960   Great Britain..........................85/61

*Primary Examiner*—Ramon S. Britts
*Attorney*—Horton, Davis, Brewer & Brugman

[57] ABSTRACT

The clamping load on a bolt or other threaded member is controlled by using a pair of nuts, one within the other, and both driven together simultaneously to contact one of the elements to be clamped, the outer one first taking the load and then fracturing along a pre-arranged circumferential line upon the imposition thereon of a predetermined axial load, the spring-back in the system then transferring the load from the fractured nut to the inner nut. The outer nut continues advancing against the inner nut as a jam nut.

18 Claims, 12 Drawing Figures

PATENTED APR 24 1973 3,728,933

INVENTOR
William L. Grube
by Davis, Lucas, Brewer,
and Brugman
Att'ys

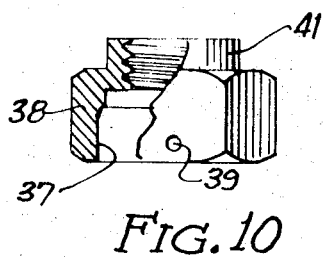
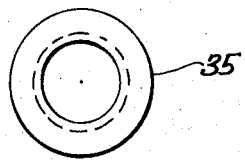
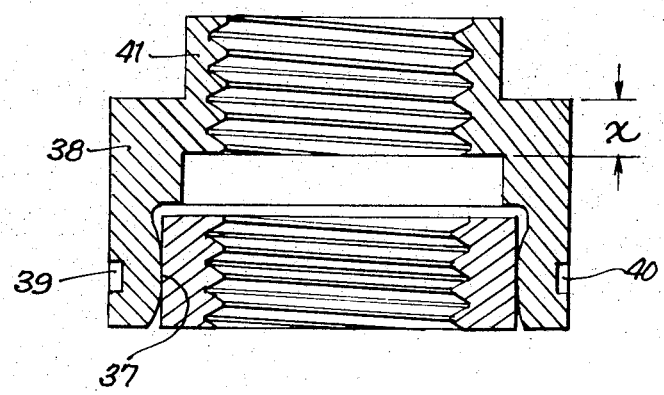
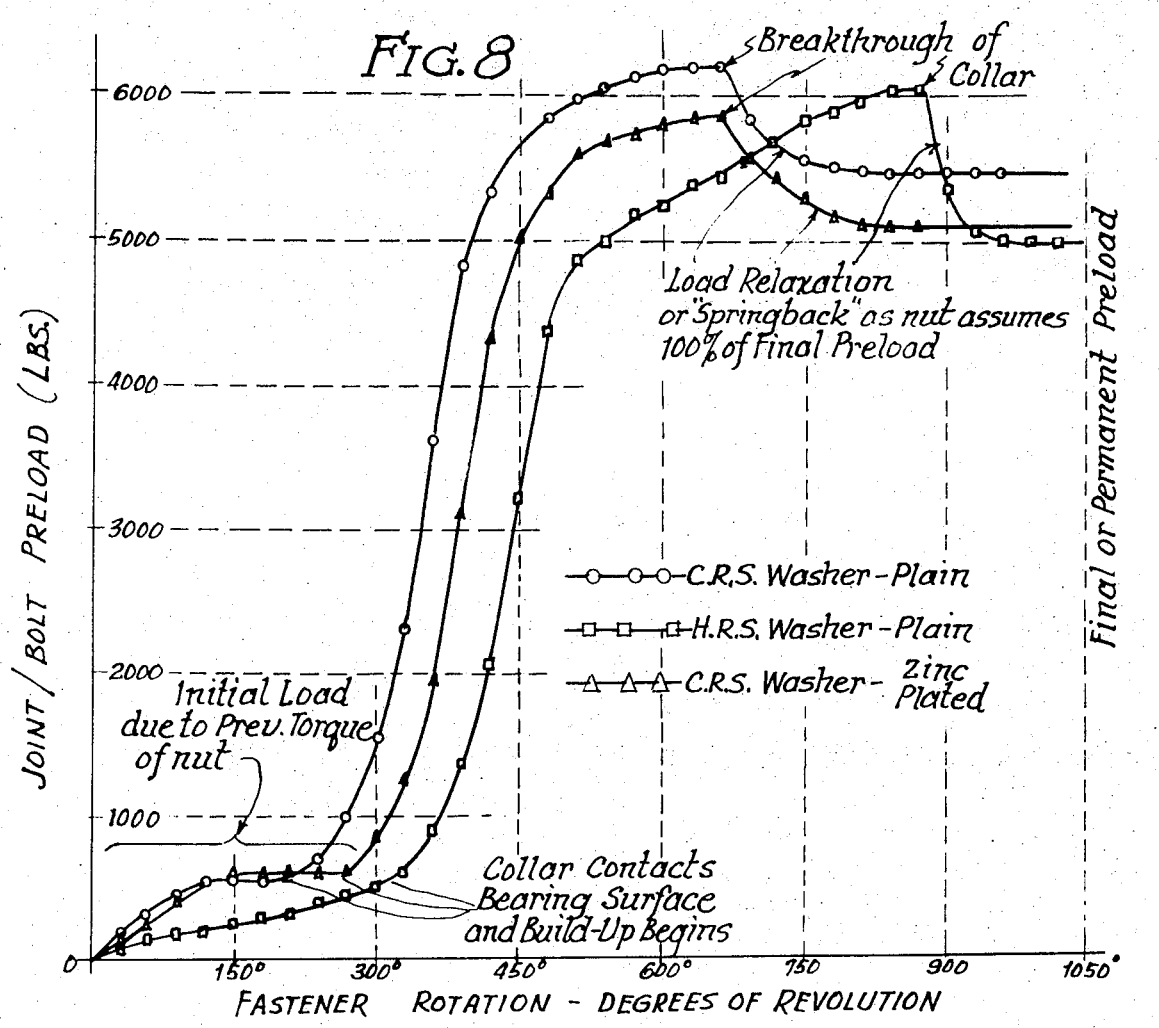

MEANS AND METHOD FOR CONTROLLING TENSION IN A THREADED MEMBER

This application is a continuation of earlier application, Ser. No. 791,366, filed by the same inventor on Jan. 15, 1969, and entitled "MEANS AND METHOD FOR CONTROLLING TENSION IN A THREADED MEMBER", which earlier application is now abandoned.

This invention relates to a means and method for controlling the amount of tension created in an externally threaded member such as a bolt or stud by a nut used to draw the said bolt or stud through an opening in one of the elements to be fastened.

For many years there has been evidenced by design and production engineers an increasing desire to have a threaded type fastening system that would in some manner indicate or regulate the amount of pre-load developed in the assembled joint. By "pre-load" is meant the tension in the threaded member created by the assembly of the joint without any working load. At the present time there appears to be no practical or economical way of accomplishing this result on an assembly line or production basis. There do exist several forms of laboratory devices which make use of compressible or tapered washers designed to be upset or thickened under compression, the thickness being taken as an indication of the pre-load in the joint. There have also been attempts to design hydraulically regulated tools which pull the end of a bolt through an opening to a controlled tension while a captive nut is run down on the bolt and seated. None of these laboratory devices has proved feasible for production line work.

Present production methods used to control pre-load employ torque load as a factor in determining the tension in a fastener. This approach has several drawbacks, one of which is that no accurate torque control impact or slip clutch type power wrench has yet been devised. Another drawback is that even were such a tool to be devised, the relationship between seating torque and joint pre-load under production conditions is not accurately predictable. The torque-tension relationship is directly dependent upon the apparent coefficient of friction between mating threads and, more importantly, on friction between the bearing face of the fastener and the surface of the material being fastened. By actual measurement, this coefficient of friction has been found to vary from 0.15 up to 0.50, resulting in a range of over three to one under laboratory conditions, and these conditions are undoubtedly worse in actual production conditions. This large variation in the coefficient of friction, of course, causes a very great variation in torque-tension.

In one organization, as an example, the automobile manufactured by it uses over 40 fasteners on which it is required to maintain some control over the joint pre-load. To satisfy this requirement, it was necessary for the organization to use two men on its assembly line to apply each fastener. The fasteners used nuts to make the joint, and the first man applied the nut with a nut runner until the nut was seated at some torque value less than the desired pre-load. The second man then torqued the nuts to a specified torque using a conventional hand torque wrench. It is estimated that each applied nut cost the manufacturer approximately 18 cents for the completed operation. Despite the care taken in this instance, the seating torque varied 10 percent and the actual strain on the fastener as measured by a gauge indicated that the resulting clamp load varied 40 to 45 percent. This means that in order to maximize fatigue life, the pre-load capabilities of the fastener and joint must be some 40 to 45 percent greater than maximum service design load or, in other words, an additional safety factor must be built into the system. This, of course, requires greater strength in the parts to be assembled, as well as heavier fasteners than are actually desired, with the result that the cost of the actual parts involved is increased, thus adding to the already high assembly costs.

The "turn-of-the-nut" principle has also been proposed and tried as an attempt to control pre-load in a threaded fastener assembly. According to this principle, in order to isolate the variations of pre-load due to variations in friction and bearing surface conditions when loading to a controlled torque, the lead of the thread can be used as a gauge to determine bolt elongation relative to joint compression. In this method, a nut is run down until "firm" on the joint and then is turned through a predetermined additional angle. This method, however, is also unsatisfactory. It is approximately as slow and tedious as a torque wrench method, and in addition, the variables of joint elasticity and bolt elasticity, as well as initial torque, have been introduced. The clamp load developed by this method is dependent upon the relationship of total elongation (developed by the amount that the nut is advanced after initial seating) to the load versus the strain curve of the bolt, and the load versus the strain curve of the joint. The latter is in turn a function of bolt diameter, overall bolt length, length of thread, the kind of joint material and its modulus of elasticity, and the effective bearing area of the joint. In addition, this method also assumes perpendicularity of the bearing area to the thread axis, absence of irregularities in the mating joint materials, and controlled initial torque before the nut is turned the specified amount. Thus this is a method which can be made to work fairly consistently in the laboratory where all variables are fixed or controlled, but it has not proved to have appreciable merit on the production line where these variables are necessarily allowed their normal fluctuations.

It is accordingly an object of this invention to provide a self-contained fastener that can be applied with a conventional impact wrench and will automatically sense a predetermined axial load in the joint and fastener assembly at which point it will cease to tighten further.

Another object of this invention is the provision of a dual fastener for a joint, one of which creates the desired pre-load in the assembly after which it is ruptured and the load automatically transferred to the second fastener.

Yet another object of this invention is to provide a method of pre-loading a joint by means other than the fastener to be used, the pre-loading being automatically terminated upon the attainment of a predetermined value and the pre-load being automatically transferred to the fastener.

It is also within the purvue of this invention to provide means for establishing a pre-load on a joint to be held together by a fastener, the pre-load being established independently of said fastener and then transferred to said fastener at the desired value, the pre-loading means then functioning as a jam nut.

These and other objects of this invention will become apparent from the following detailed description of a preferred embodiment thereof when taken together with the accompanying drawings in which FIG. 1 is an elevational view of a nut and tensioner in assembled relation;

FIG. 8 is a chart showing the joint and bolt pre-load for various degrees of revolution of the fastener;

FIG. 9 is a side elevational view of a modification of the tensioner of FIG. 2;

FIG. 10 is an elevational view of a modification of the nut of FIG. 2, adapted to cooperate with the tensioner of FIG. 9;

FIG. 11 is a plan view of the nut of FIG. 10; and

FIG. 12 is an enlarged cross-section through the assembled tensioner and nut of FIGS. 9 and 10.

Figure 1:
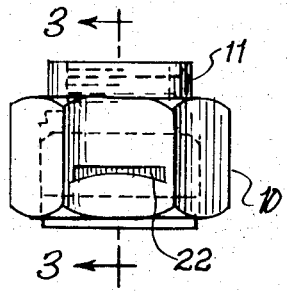
Figure 2:
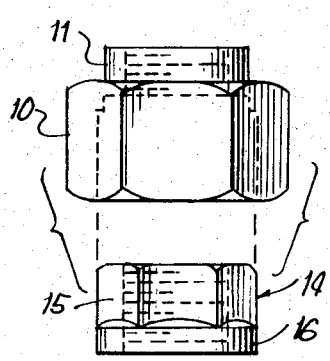
FIG. 2 shows the nut and tensioner of FIG. 1 in exploded relation.

The objectives of this invention are achieved in the form depicted in the drawings by providing a threaded tensioning device which is advanced on the bolt, and upon contact with the joint and continued rotation on the bolt, establishes an increasing tension in the bolt until a desired maximum is achieved, whereupon the load is transferred automatically and slightly diminished to a nut which has simultaneously been advanced into contact with the joint but with little force. The tensioning device compresses the members to be joined by the fastener so that with the nut in contact with the joint the relaxation of the joint members upon transfer of the tension stress from the tensioning device causes the nut to assume this stress and thus hold the joint in assembled relation. The exact point at which the stress is transferred is determined by designing the tensioning device to have a section which will shear upon the imposition thereon of an axial force substantially equal to the maximum tension to be borne by the bolt plus the relaxation force of the joint upon transfer of the load.

The nut and tensioning device are assembled and handled as a unit which may be applied to a bolt by an ordinary nut runner in the usual manner. The operator readily senses the completion of the operation by a sudden reduction in the torque required to turn the device. The threaded portion of the tensioning device remains on the bolt and is advanced upon the nut by the sheared portion to function as a jam nut.

Figure 3:
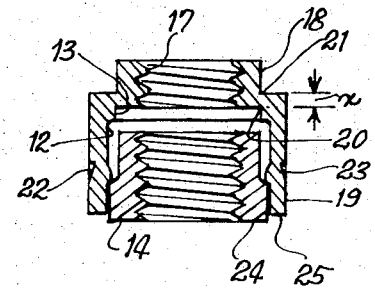
FIG. 3 is a cross-section through the assembled nut and tensioner of FIG. 1 taken along line 3—3 thereof.

Referring now to the drawings for a detailed description of the invention, the assembled nut and tensioning device is shown therein as a hexagonal member resembling a hexagonal collar 10 and an axial extension 11 on the upper end thereof. Collar 10 has a first counterbore 12 (FIG. 3) and a second counterbore 13. Within counterbore 12 is disposed a nut 14 which is ultimately to assume the full load of the fastener. Said nut 14 is depicted as having an upper portion 15 of hexagonal shape and a lower portion 16 of cylindrical shape. The upper portion may also be cylindrical, if desired, but for easy removal of the nut from the joint the hexagonal shape is preferred. The axial dimension of nut 14 is less than the axial dimension of first counterbore 12 so that the bottom of counterbore 12 never touches nut 14. The axial extension 11 has internal threads 17 and is in fact a second nut adapted to be threaded upon the same bolt as nut 14. Said extension 11 has a cylindrical outer surface 18, the diameter of which is slightly less than the diameter of counterbore 13.

The hexagonal portion 19 of collar 10 is connected to the threaded axial extension 11 thereof by a thin radial flange having an axial dimension X and a radial dimension equal to the difference in diameters between counterbore 13 and the outer diameter of surface 18. It is intended that the hexagonal portion 19 be sheared from the axial extension 11 as an indication of the attainment of the proper tensioning force in the bolt, and to this end the corners 20 and 21 defining the axial limits of the connection are made sharp to promote severance of the two portions of the nut along a surface connecting these corners. The area of the surface is determined by the axial distance between corners 20 and 21 and the mean diameter between said corners. With the area known and the shear strength of the material of the connection also known, the stress required to produce a rupture can be determined.

Nut 14 is held in counterbore 12 by creating indentations 22 and 23 on opposite sides of the hexagonal portion 19 of collar 10, said indentations serving to hold the nut 14 frictionally in counterbore 12 with a prevailing torque which is determined to be much less than the torque on collar 10 at which rupture of the connection occurs.

Inasmuch as the assembly of a nut 14 with a collar 10 is preferably made without reference to the orientation of the threads of the nut relative to the threads on axial extension 11, there may be a slight axial shift of the nut 14 in collar 10 as the two are advanced on a threaded bolt. It is desirable, however, that the bottom surface 24 of nut 14 contact the adjacent element of the joint to be secured, simultaneously with, or slightly ahead of bottom surface 25 of the hexagonal portion 19. The reasons for this action will be made clear hereinafter.

Figure 4:
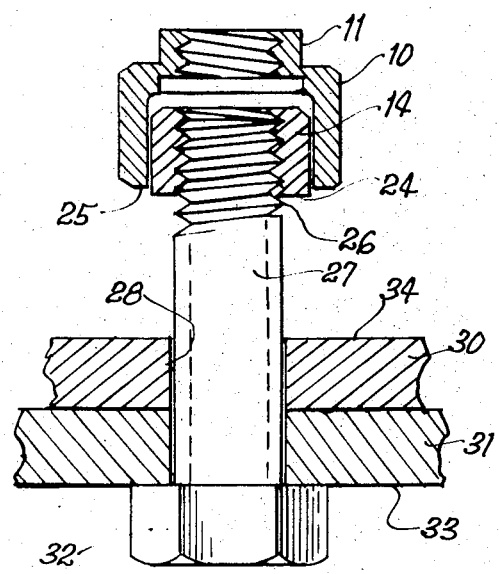
FIGS. 4, 5, 6 and 7 show a joint and fastener to be assembled in clamped relation by the nut and tensioner of FIG. 1, the latter being shown in various stages of operation.
Figure 5:
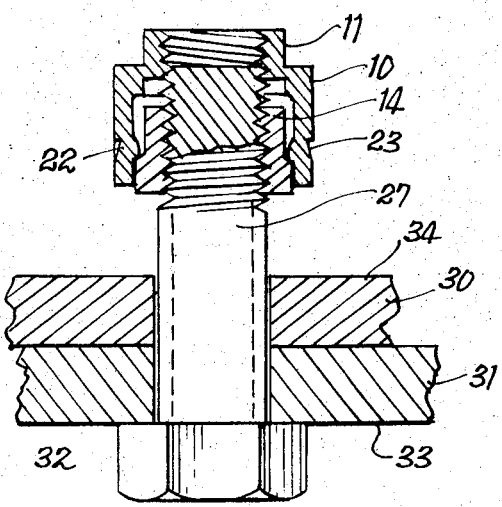

The various stages in the application of the nut 14 to a joint are shown in FIGS. 4, 5, 6 and 7. In FIG. 4 the assembled nut 14 and collar 10 are placed over the external threads 26 of a bolt 27. Nut 14 is partly advanced thereon by any known means, such as a nut runner pneumatically or electrically driven, the nut runner acting only upon collar 10 so that collar 10 transmits the drive to nut 14 through indentations 22 and 23. In the form selected to illustrate this invention, bolt 27 extends through aligned openings 28 and 29 in two sheets 30, 31 which are to be connected together by the bolt and nut to form a firm joint with a predetermined pre-load upon the bolt. The head 32 of bolt 27 abuts upon surface 33 of sheet 31, and it is contemplated that upon completion of the clamping action of bolt 27 and nut 14, the latter, and particularly the bottom surface 24 thereof, will abut upon surface 34 of sheet 30 with such force as is required to produce the desired tension or pre-load in bolt 27.

Continued rotation of collar 10 causes it to advance with nut 14 upon the threads of bolt 27 through the friction connection established therebetween by the indentations 22 and 23. At some point in the movement of collar 10 on bolt 27 the end of the bolt contacts the lower end of the extension 11 (FIG. 5) and if at that moment the threads of the bolt and extension 11 are not properly aligned, collar 10 will be held back by the end of the bolt while nut 14 continues its advance, but in less than 360° such alignment is effected and collar 10 will be advanced upon the threads of bolt 27 by its own threaded extension 11.

Figure 6:
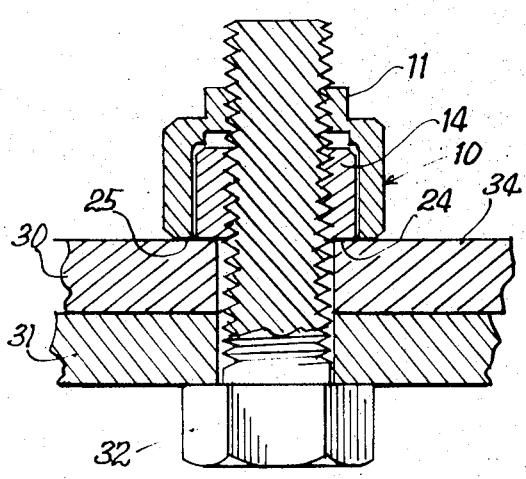
Figure 7:
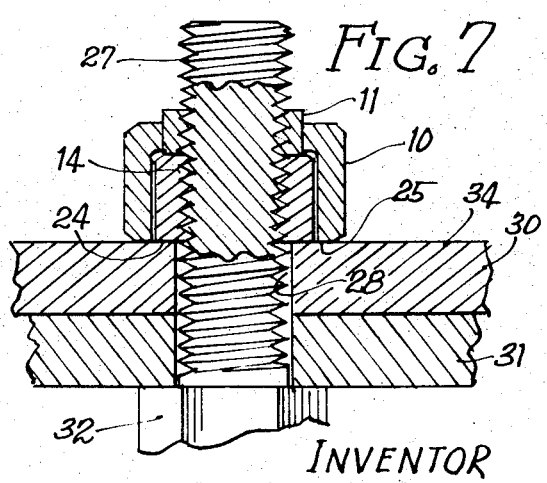

Such advancement of the nut 14 and collar 10 continues until both contact surface 34, as shown in FIG. 6. Should surface 24 of nut 14 contact surface 34 ahead of surface 25 of the hexagonal portion 19, nut 14 will be held back while collar 10 continues to advance into contact with surface 34, i.e., the drive between collar 10 and nut 14 will slip. It is important for the successful operation of this invention that surface 24 be in contact with surface 34 at the same time as or slightly prior to contact between surface 25 and surface 34.

With nut 14 abutting upon surface 34, as illustrated in FIG. 6, continued rotation of collar 10 causes the joint members 30 and 31 to be compressed by the pressure developed by threaded extension 11 and transmitted through the flange X and collar 10 to surface 34. Nut 14 follows collar 10 and remains in contact with surface 34 also, but with negligible force. Ultimately, the shear strength of the flange X is reached and collar 10 is sheared from extension 11 along a generally cylindrical surface. This immediately relieves the joint members 30 and 31 and bolt 27 of the clamping stress produced by collar 10 and threaded extension 11, and they "spring back" or relax. However, with nut 14 also in contact with surface 34 at the instant of shear, the joint members merely relax against nut 14, which then takes up the clamping action with a force equal to the shear strength of the flange X minus the amount of relaxation permitted by the nut.

The exact point at which the collar 10 is sheared off is readily sensed by the operator of the nut runner as a sudden reduction in the reaction torque in the runner. The operator continues the nut running operation, however, and the extension 11 is driven by the friction forces or prevailing torque, developed in the sheared sections of collar 10 and extension 11 until the latter is jammed against nut 14. Meanwhile, the frictional connection between collar 10 and nut 14 is overcome and collar 10 rotates around nut 14 without further turning the nut. The parts of the joint then appear as in FIG. 7. Where vibratory working loads are not impressed upon the joint, collar 10 can remain on nut 14, but where vibration may be encountered, collar 10 may be removed from the finished joint with the nut runner by which it is applied.

The frictional torque or "prevailing" torque between the collar 10 and nut 14 is slight compared to the actual torque required to develop full clamp load, amounting to about 10 percent of the full clamp load. The tolerance or variation on the prevailing torque is not at all critical. Even if it is varied by 50 percent, the final variation would be only 10 percent of 50 percent, or 5 percent. The purpose of the prevailing torque, as described above, is to maintain the nut constantly firmly seated on the bearing surface 34 during the operation before and while the extension 11 is being sheared through collar 10 and to keep thread contact between mating bolt and nut threads in a loaded configuration awaiting the transfer of preload from extension 11 to nut 14.

Since the prevailing torque between collar 10 and nut 14 is so low, the nut 14 may be made cylindrical in external contour, as shown in FIGS. 9–12. The nut 35 there depicted has a cylindrical surface 36 and is retained in counterbore 37 in collar 38 by opposed indentations 39, 40 in the sides of collar 38. The threaded extension 41 may be identical with extension 11 of FIG. 1.

It is, of course, desirable to keep the overall height of the nut 14 and extension 11 as small as possible, both to save material of the nut and bolt, and to keep the fastener from protruding too far beyond surface 34. The thickness of the nut may be designed for supporting only the pre-load of the assembled joint and not to withstand an axial force equal to or approaching the ultimate strength of the bolt. The jamming of the extension 11 upon the nut 14 serves to reinforce the nut, and the combined nut and extension can be relied upon to have sufficient thread length to support the ultimate tensile strength of the bolt.

The uniformity of bolt tension produced by the fastener of this invention is shown in the chart of FIG. 8. The test samples used were low carbon steel cadmium plated ⅜–16 fasteners made according to this invention and assembled on a plain steel Grade 5 bolt. To show the relative independence of this fastener from friction torque, three different washers were interposed between the fastener and element to be clamped to provide three different bearing surfaces. In FIG. 8 the combined pre-load of the bolt and joint in pounds is plotted against the fastener rotation in degrees of revolution, for plain cold-rolled steel, plain hot-rolled steel and zinc-plated cold-rolled steel washers. A target 5000 lb. pre-load is assumed. Whereas these different materials would produce wide variations (2500 lbs. to 8000 lbs.) in pre-load of the bolt and joint for a given applied torque in a washer, the chart shows that they produce only an approximate 8.6 percent maximum variation from the target pre-load in the fastener of this invention.

From numerous tests of relaxation or "springback" obtained with the fastener of this assembly it can be stated generally that assuming a target breakthrough of 6000 lbs. for the collar and extension and a target final pre-load of 5000 lb., the resultant final or permanent pre-load will vary plus or minus 11 percent. This assumes a maximum manufacturing error of plus or minus 5 percent and a relaxation which was found to vary from a minimum of 11 percent to a maximum of 21 percent.

Thus the fastener of this invention automatically regulates clamp load in a bolt or the like regardless of applied torque, frictional characteristics of the joint, or surface condition of the bearing area, and is only slightly affected by the elasticity of the joint. It is as easy and fast to apply in assembly as a common nut and can be completely automated. Its "in assembly" cost is much less than that of any other known threaded fastener system where control of joint pre-load must be maintained. In addition, it controls joint pre-load more accurately than any presently known production line assembly method. It is a self-contained fastener that does not require any specialized assembly tools or special degree of skill by the operator. It is self-locking as described above, and finally, it can be manufactured by conventional cold forming and tapping or screw machine operation.

It is understood that the foregoing description is merely illustrative of a preferred embodiment of the method and fastener assembly of this invention and that the scope of the invention is not to be limited thereto but is to be determined by the appended claims.

I claim:

1. A fastener assembly for elements to be secured together, said assembly comprising a threaded member, an abutment on said member, a nut threaded on said member, said abutment and nut being adapted to compress between them the elements to be secured together, means for compressing said elements together independently of said nut to establish a pre-load in said member, said means comprising a second nut on said member axially spaced from said first nut and having thereon an integral collar extending axially from one end of the second nut for encircling said first nut and having at the end remote from the second nut a surface for contacting the element contacted by the first nut, a radial segment of predetermined thickness and of small radial length providing a connection between said collar and second nut, said collar having an internal diameter adjacent the nut at least as large as the external diameter of the second nut, and means providing a relievable driving connection between said first nut and said collar to advance the first nut, collar and connected second nut together on said member into substantially simultaneous contact with said element; said radial segment being rupturable by predetermined axial shear stress resulting from continued rotation of said collar after contact thereof with said element thereby to effect transfer of axial force from said collar to said first nut and provide control of the maximum tension in said member.

2. A fastener assembly as described in claim 1, said second nut and collar being formed as a single piece wherein said radial segment is characterized by sharp axially displaced and opposed corners which are in near axial alignment.

3. A fastener assembly as described in claim 1, said means providing a relievable driving connection between said first nut and said collar comprising means for establishing a prevailing torque between said first nut and said collar, said prevailing torque being less than the torque required to be impressed upon the second nut to produce the desired tension in the threaded member.

4. A fastener assembly as described in claim 1, said means providing a relievable driving connection between said first nut and said collar comprising frictionally engaged surfaces on said collar and said first nut to provide a prevailing torque connection therebetween.

5. A fastener assembly as described in claim 1, said releasable drive comprising a cylindrical surface on said first nut, and radial indentations on said collar frictionally contacting said cylindrical surface to provide a prevailing torque engagement therebetween.

6. A fastener assembly for elements to be secured together, said assembly comprising a threaded member, an abutment on said member, a nut threaded on said member, said abutment and nut being adapted to compress between them the elements to be secured together, means for compressing said elements together independently of said nut to establish a pre-load in said member, said means comprising a second nut on said member axially spaced from said first nut, a collar encircling said first nut and adapted to contact the element contacted by the first nut, a radial connection between said collar and second nut, and a releasable drive between said first nut and said collar to advance the first nut, collar and connected second nut together on said member into substantially simultaneous contact with said element; said radial connection breaking upon being subjected to a predetermined axial shear stress by continued rotation of said collar after such contact, whereby to transfer the axial thrust from said collar to said first nut and thereby control the maximum tension in said member, said collar and second nut being formed as a single piece having a first counterbore in which the first nut is received and a second counterbore, said second nut having a cylindrical outer surface the diameter of which is substantially equal to the diameter of the second counterbore, and the corners formed by the second counterbore and the outer surface of said second nut defining the minimum cross-sectional area of the collar and second nut to provide the aforesaid radial connection between the collar and second nut.

7. A fastener assembly as described in claim 6, said second nut commencing at the bottom of said second counterbore.

8. A fastener assembly as described in claim 6, the corners formed by the second counterbore and the outer surface of the second nut and defining the connection between the nut and collar being sharp to define a connection surface of predetermined dimensions along which said connection may break as aforesaid.

9. A fastener assembly as described in claim 1, said collar being hexagonal in external shape and constituting the means by which torque is imparted to the second nut.

10. A fastener assembly as described in claim 1, said radial connection when broken establishing a prevailing torque between the collar and second nut, whereby said second nut is advanced against the first nut as a jam nut by said collar after said connection is broken.

11. A method of limiting the tension exerted through a threaded fastener having co-acting and relatively rotatable first and second fastening members which are adapted to apply clamping force against workpiece elements disposed in juxtaposed relationship to one another and having the first of the fastening members extending slidably through at least one of the workpiece elements, said method comprising the steps of anchoring the first fastening member relative to one of the workpiece elements, threading the second fastening member onto the first fastening member, threading onto the first threaded member an auxiliary threaded member which bridges across and over the second fastening member to engage the workpiece element other than the one to which the first threaded member is anchored and which has a section rupturable in shear as a result of clamping load exerted between the workpieces through the first fastening member and auxiliary threaded member when the auxiliary threaded member is tightened against the workpiece element engaged thereby, turning the first threaded member to the extent required to effect rupture of said rupturable section, and turning said second fastening member relative to the first fastening member to the extent that said second fastening member maintains surface contact with the workpiece element engaged by the auxiliary threaded member as the auxiliary threaded member is tightened, whereby the clamping load is transferred to said second fastening member from the auxiliary threaded member when the auxiliary threaded member ruptures.

12. A method as described in claim 11, said method comprising the further step of advancing the threaded portion of the auxiliary threaded member against the second fastening member after the axial stress has been transferred.

13. A method of limiting the tension exerted through a threaded fastener as defined in claim 11, and wherein said second fastening element is frictionally driven from said auxiliary threaded member when the auxiliary threaded member is tightened.

14. A method of limiting the tension exerted through a threaded fastener as defined in claim 11, and wherein the rupture of the auxiliary threaded member occurs at an axial stress in the first fastening member and the auxiliary threaded member which is approximately equal to the desired limiting tension in the threaded fastener plus the valve of relaxation stress which results from the transfer of clamping load from the auxiliary threaded member to the second fastening member.

15. In a fastener assembly for applying to a workpiece a clamping force closely approximating a predetermined safe working load for the fastener assembly and which fastener assembly embodies two co-axial fastener elements having opposed workpiece engaging surfaces and which fastener elements are connected to one another through threads so that rotation of one of the fastener elements relative to the other changes the clamping force, the combination wherein one of said fastener elements comprises a collar portion having at one end thereof one of the workpiece engaging surfaces, a second portion co-axial with said collar portion and having an axial segment of predetermined external radial size which extends axially from the end of said collar opposite said workpiece engaging surface thereof, said collar portion and said second portion having different external radial dimensions and being axially co-extensive and integrally adjoined through an axial segment of a preselected thickness proportioned to rupture in axial shear at a clamping force at least equal to said predetermined safe working load for the fastener assembly, said second portion having threads for co-action with the other of said fastener elements, and said collar having an axial region adjacent said axial segment of preselected thickness which has an internal radial dimension equal to or slightly greater than the external radial size of said second portion so that said axial segment of preselected thickness will be ruptured in shear in an axial direction by axial force developed in the fastener assembly when the clamping force developed through said threads and against said workpiece engaging surface of the collar reaches a value dependent upon said preselected thickness and said safe working load for the fastener assembly, said axial region of the collar and said axial segment of preselected thickness having comparable dimensions axially of the collar, so that the rupture of said axial segment is complete, and said collar having a counterbore of substantial axial length and of larger radial size than said internal radial dimension extending toward said axial segment of preselected thickness from the workpiece engaging surface at one end of the collar, the combination being further characterized by said threads being internal of the second portion, and there being a nut mounted in said counterbore in the collar and having frictional driving engagement with the collar, said nut having threads corresponding to those in the second portion, and said nut having a workpiece engaging end surface adjacent the workpiece engaging surface of the collar.

16. In a fastener assembly as defined in claim 15, said nut having an external surface portion of polygonal section and an external surface portion of circular section through which the frictional driving engagement with the collar is effected.

17. A method of effecting control of the clamping force exerted against a workpiece by a threaded fastener which embodies one threaded fastener element having a portion engaging one surface of a workpiece and a pair of co-acting threaded fastener elements which are each threadedly engaged with said one fastener element and are constructed and arranged with a prevailing torque connection therebetween and have portions which simultaneously engage a surface of the workpiece opposed to said one, which method comprises the steps of tightening said pair of fastener elements relative to said one fastener element and against the workpiece by the application of torque to one of the pair of fastener elements while the second of the pair of fastener elements is tightened by virtue of said prevailing torque connection between the fastener elements of the pair, continuing the tightening of the pair of fastener elements until a predetermined measured value of clamping force is exerted between the workpiece and said one of the pair of fastener elements, which predetermined measured value of clamping force is related to the safe working load for the threaded fastener, and effecting release of the force exerted against the workpiece by said one of the pair of fastener elements without changing the tightened position of the second of the pair of fastener elements relative to said one threaded fastener element to transfer the clamping force exerted on the workpiece to the second of the pair of fastener elements with accompanying force relaxation resulting from said transfer and the compression characteristics of the second of the pair of fastener elements.

18. A method of effecting control of the clamping force against a workpiece by a threaded fastener as defined in claim 17, and wherein said predetermined measured value of clamping force is sensed by the rupture in shear in the direction of the clamping force of a frangible section of said one of the pair of fastener elements.

* * * * *